(12) United States Patent

You et al.

(10) Patent No.: US 10,324,480 B2
(45) Date of Patent: Jun. 18, 2019

(54) DYNAMIC SWITCHING FREQUENCY CONTROL IN MULTIPHASE VOLTAGE REGULATORS

(71) Applicant: Infineon Technologies Austria AG, Villach (AT)

(72) Inventors: Zhiqing You, Torrance, CA (US); Tim Ng, Monterey Park, CA (US); Amir Babazadeh, Laguna Hills, CA (US); Jinghong Guo, Torrance, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/729,170

(22) Filed: Oct. 10, 2017

(65) Prior Publication Data

US 2019/0107853 A1   Apr. 11, 2019

(51) Int. Cl.
G06F 1/10        (2006.01)
G05F 1/10        (2006.01)
H02M 3/158       (2006.01)

(52) U.S. Cl.
CPC .......... G05F 1/10 (2013.01); H02M 3/1584 (2013.01); H02M 2003/1586 (2013.01)

(58) Field of Classification Search
CPC ......... G05F 1/10; H02M 3/156–3/158; H02M 3/1584
USPC ........................................... 323/312
See application file for complete search history.

(56) References Cited

U.S. PATENT DOCUMENTS

| 3,419,818 | A  | * | 12/1968 | Salihi | ................. | H02M 3/135 |
|           |    |   |         |        |                   | 327/584    |
| 7,944,191 | B2 | * | 5/2011  | Xu     | ................. | H02M 3/1588|
|           |    |   |         |        |                   | 323/225    |
| 8,618,788 | B2 | * | 12/2013 | Trivedi| ............... | H02M 3/1584|
|           |    |   |         |        |                   | 323/241    |
| 8,901,901 | B2 | * | 12/2014 | Ziegler| ............... | H02M 3/1584|
|           |    |   |         |        |                   | 323/271    |
| 2008/0298093 | A1 | * | 12/2008 | Jin | ................ | H02M 3/285 |
|           |    |   |         |        |                   | 363/21.06  |
| 2009/0309564 | A1 |   | 12/2009 | Zafarana et al. | | |
| 2011/0133704 | A1 |   | 6/2011  | Zambetti et al. | | |
| 2013/0207630 | A1 | * | 8/2013  | Rahardjo | ............. | H02M 3/156 |
|           |    |   |         |        |                   | 323/283    |
| 2014/0015500 | A1 | * | 1/2014  | Babazadeh | ......... | H02M 3/1584|
|           |    |   |         |        |                   | 323/272    |
| 2016/0233766 | A1 |   | 8/2016  | Todorov et al. | | |

* cited by examiner

*Primary Examiner* — Yemane Mehari
(74) *Attorney, Agent, or Firm* — Murphy, Bilak & Homiller, PLLC (57) ABSTRACT

A multiphase voltage regulator includes a plurality of phases and a controller. Each phase is configured to output a phase current to a load through an inductor in response to a control signal input to the phase. The controller is operable to: generate the control signals input to the phases; set a switching frequency of the control signals to a first value; and change the switching frequency from the first value to a second value different than the first value if the load current changes repetitively at a frequency that is within a predetermined range of the first value of the switching frequency. A corresponding method of operating the multiphase voltage regulator is also provided.

20 Claims, 6 Drawing Sheets

DYNAMIC SWITCHING FREQUENCY CONTROL IN MULTIPHASE VOLTAGE REGULATORS

TECHNICAL FIELD

The present application relates to multiphase voltage regulators, in particular dynamic switching frequency control in multiphase voltage regulators.

BACKGROUND

A multiphase voltage regulator has a plurality of phases operated at the same fixed switching frequency for delivering current to a load. Multiphase voltage regulators are typically controlled so as to distribute current evenly across the phases, also referred to as current balance. The load powered by the regulator may be dynamic in that the load current changes very quickly (i.e. high di/dt) and with a high repetition rate (frequency). If the load current changes repetitively at a frequency that is at or near the fixed switching frequency (Fsw) of the multiphase voltage regulator or ½ Fsw, aliasing occurs. Because the voltage loop gain of the controller is not zero under such dynamic load transient conditions, the control loop drives the phase currents to circulate at a beat frequency rate which is the delta frequency between Fsw and the transient load frequency when aliasing occurs. One or more of the phase currents may exceed the inductor saturation current limit or the power stage peak current limit due to this aliasing effect, which could result in catastrophic system damage.

One conventional approach for mitigating the aliasing problem involves clamping the phase currents to a safe level by truncating the PWM (pulse width modulation) pulses applied to the phases when a phase current exceeds the preset peak-to-peak current limit, and tri-stating the PWM pulses or turning on the high-side switch device of a phase when a phase current is lower than the negative current limit. However, with this approach, output voltage regulation is affected with undershoot and overshoot excursions.

Another conventional approach for mitigating the aliasing problem involves lowering the voltage feedback loop bandwidth of the multiphase regulator controller and allowing the output capacitance of the regulator system to handle high-frequency load transients. However, with this approach, an excessive amount of output capacitance is required to reduce output voltage undershoot or overshoot during large step load transients (e.g. 10 A to 200 A or vice-versa).

Yet another conventional approach for mitigating the aliasing problem involves increasing the bandwidth of the current balance control loop of the multiphase regulator controller. However, with this approach, the increased current balance bandwidth reduces the voltage loop gain/phase margin and hence degrades the stability of the output voltage loop of the controller.

Thus, there is a need for a more effective aliasing avoidance mechanism for multiphase voltage regulators.

SUMMARY

According to an embodiment of a multiphase voltage regulator, the regulator comprises a plurality of phases and a controller. Each phase is configured to output a phase current to a load through an inductor in response to a control signal input to the phase. The controller is operable to: generate the control signals input to the phases; set a switching frequency of the control signals to a first value; and change the switching frequency from the first value to a second value different than the first value if the load current changes repetitively at a frequency that is within a predetermined range of the first value of the switching frequency.

According to an embodiment of a method of operating a multiphase voltage regulator that has a plurality of phases, each phase configured to output a phase current to a load through an inductor in response to a control signal input to the phase, the method comprises: setting a switching frequency of the control signals to a first value; and changing the switching frequency from the first value to a second value different than the first value if the load current changes repetitively at a frequency that is within a predetermined range of the first value of the switching frequency.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIGS. 3A through 4B illustrate respective graphical diagrams plotting regulator output voltage and phase currents for different dynamic load transient frequency examples, with and without the dynamic frequency control.

DETAILED DESCRIPTION

The embodiments described herein mitigate against phase current aliasing in multiphase voltage regulators, by changing the switching frequency (Fsw) of the multiphase voltage regulator from a base value to a different value if the load current changes repetitively at a frequency (Fload) that is within a predetermined range of the base value of the switching frequency. By moving the switching frequency Fsw far enough away from the dynamic load transient frequency Fload, any oscillations fall outside the bandwidth of the control loop in a frequency range where the loop gain is low, damping the oscillations. As a result, peak-to-peak current per phase is significantly reduced, the regulator output voltage is more stable because no PWM truncations are needed to limit peak current, higher efficiency is realized because no additional losses are produced by circulating current, stress on the phases is reduced because of reduced peak current, and load current is evenly distributed in different phases.

Figure 1:
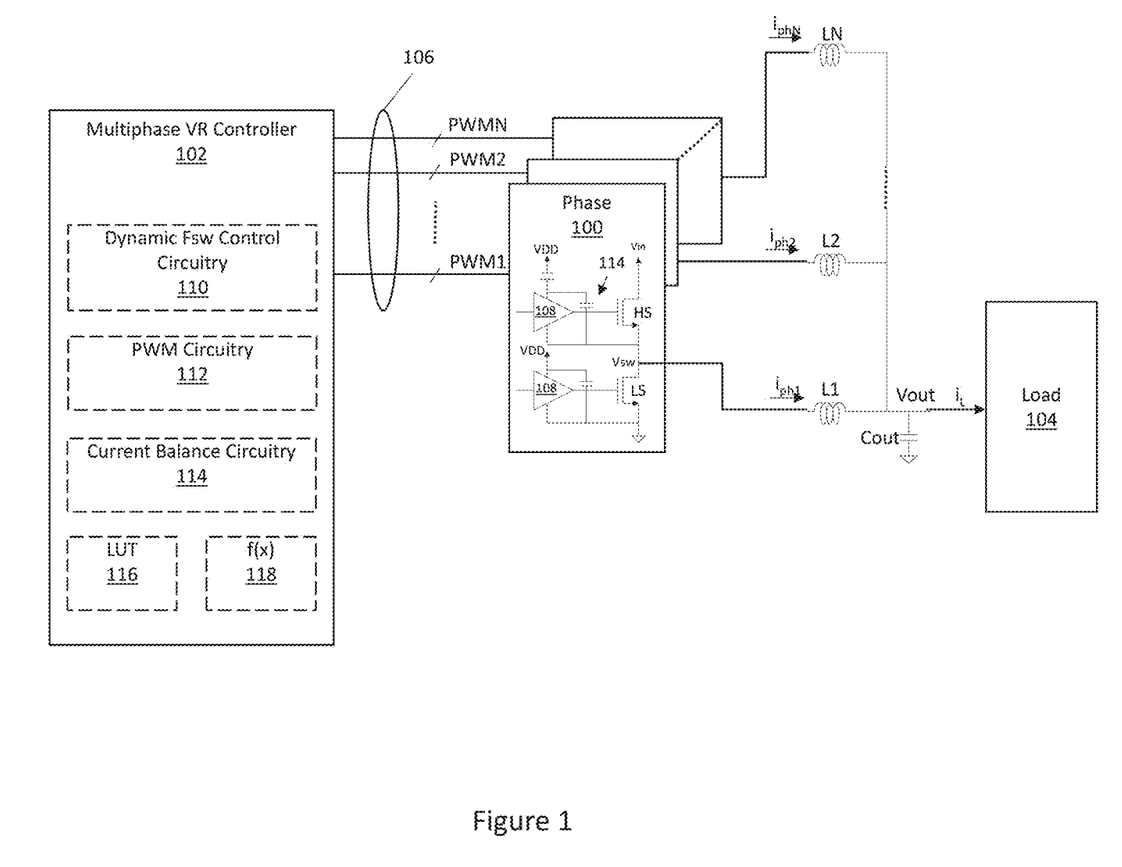
FIG. 1 illustrates a block diagram of an embodiment of a multiphase voltage regulator with dynamic frequency control.

FIG. 1 illustrates an embodiment of a multiphase voltage regulator (VR) system. The multiphase voltage regulator system includes a plurality of phases (power stages) 100 and a VR controller 102 for controlling operation of the individual phases 100, so as to regulate the output voltage (Vout)

provided to a load 104. Each phase 100 can be connected to the load 104 via a respective inductor Lx and via an output capacitor Cout, which can be physically implemented as a single capacitor or a bank of capacitors. The load 104 can be an electronic system requiring one or more regulated voltages, such as a processor, ASIC (application-specific integrated circuit), memory device, etc., or the load 104 can be another converter e.g. in the case of a multi-stage voltage converter system.

A communication interface 106 is provided between the VR controller 102 and the individual phases 100. Control signalling, telemetry reporting and fault reporting can be provided over the communication interface 106, which is depicted simplistically in FIG. 1 for ease of illustration.

Each phase 100 of the multiphase voltage regulator system includes high-side and low-side switch devices HS, LS connected between an input voltage (Vin) and ground. The high-side and low-side switch devices HS, LS are coupled at a common node Vsw, and each phase 100 also includes one or more gate drivers 108 configured to drive the respective gates of the high-side and low-side switch devices HS, LS of that phase 100. Each phase 100 is configured to output a phase current ipx to the load 104 through the corresponding inductor Lx in response to a control signal such as a PWM signal (PWMX) input to the phase 100.

The multiphase voltage regulator controller 102 generates the control signals input to the phases 100, and sets the switching frequency (Fsw) of the PWM control signals to a base value $Fsw_0$. The switching frequency Fsw remains fixed at the base value $Fsw_0$ until the dynamic load transient frequency Fload of the load 104 approaches $Fsw_0$ or ½ $Fsw_0$ where multiphase VR phase current starts to oscillate. The controller 102 includes dynamic frequency control (DFC) circuitry 110 for changing the switching frequency Fsw from the base value $Fsw_0$ to a different value $Fsw_1$ if the load current $i_L$ changes repetitively at a frequency (Fload) that is within a predetermined range of the base value $Fsw_0$ of the switching frequency Fsw.

For example, the controller 102 can include PWM circuitry 112 for generating the PWM control signals provided to the respective phases 100. The controller 102 can also include current balance circuitry 114 for adjusting the duty cycle (d) of one or more of the PWM control signals to balance the phase currents $i_{phX}$. The DFC circuitry 110 included in or associated with the multiphase VR controller 102 can change the switching frequency Fsw from the base value $Fsw_0$ to a different value $Fsw_1$ if the phase currents $i_{phX}$ cannot be balanced without exceeding a peak current limit of the inductors, the peak current limit selected to avoid inductor saturation.

Figure 2:
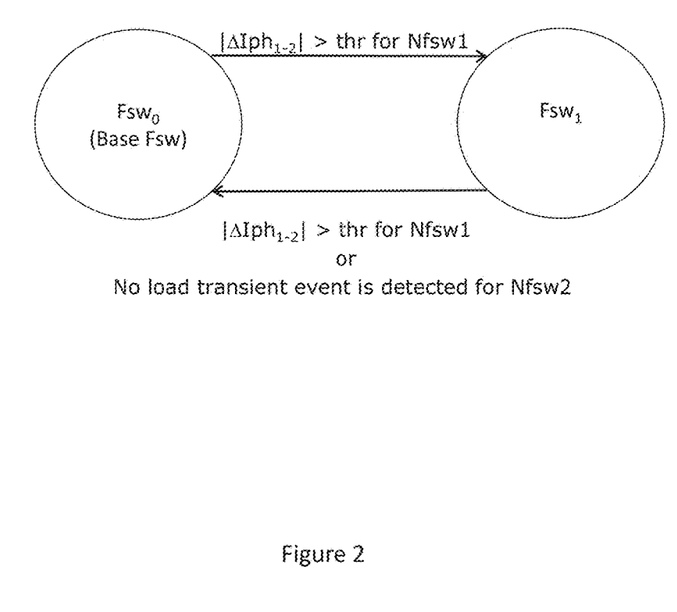
FIG. 2 illustrates a block diagram of an embodiment of the dynamic frequency control.

FIG. 2 illustrates another embodiment of the Fsw control process implemented by the DFC circuitry 110 included in or associated with the multiphase VR controller 102. According to this embodiment, the DFC circuitry 110 can change the switching frequency Fsw between $Fsw_0$ and $Fsw_1$ based on phase current information provided by the current balance circuitry 114. The current balance circuitry 114 can include any standard circuitry for sensing and/or measuring the phase currents and the output voltage Vout of the system. The controller 102 also uses the phase current and output voltage feedback information to adjust the duty cycle of the PWM control signals input to the phases 100.

If the absolute difference between two sensed/measured phase currents (e.g. $i_{ph1}$ and $i_{ph2}$ in FIG. 2) exceeds a threshold value thr for longer than a defined time interval Nfsw1, the DFC circuitry 110 changes the switching frequency Fsw from the base value $Fsw_0$ to $Fsw_1$ or from $Fsw_1$ back to the base value $Fsw_0$, depending on which value Fsw is set at when the phase current threshold condition is satisfied. This way, the controller 102 can respond to dynamic load frequency changes by making corresponding adjustments to the switching frequency Fsw. In one embodiment, the threshold value thr and the defined time interval Nfsw1 are selected so that the DFC circuitry 110 can change the switching frequency Fsw from $Fsw_0$ (or $Fsw_1$) to $Fsw_1$ (or $Fsw_0$) before the peak current limit of the inductors is exceeded. In another embodiment, the DFC circuitry 110 determines $Fsw_1$ from a lookup table (LUT) 116 e.g. based on peak current which determines which Fsw value to select (e.g. higher peak current, lower Fsw change and vice-versa). In yet another embodiment, the DFC circuitry 110 determines $Fsw_1$ based on a formula f(x) 118 programmed into the controller 102. For example, peak current and the present value of Fsw ($Fsw_0$ or $Fsw_1$) can be input to a logic block which implements the formula f(x) 118 to determine the amount of Fsw adjustment (increase/decrease).

As mentioned above, the DFC circuitry 110 included in or associated with the multiphase VR controller 102 can likewise change the switching frequency Fsw from $Fsw_1$ back to the base value $Fsw_0$ if the frequency Fload at which the load current $i_L$ changes repetitively moves to within a predetermined range of $Fsw_1$. This way, Fsw can move back and forth between $Fsw_0$ and $Fsw_1$ in response to the dynamic load transient frequency Fload, to avoid oscillations that fall within the bandwidth of the control loop where loop gain is high. When the dynamic load transient condition goes away, the trigger mechanism to move back to the base $Fsw_0$ value can be error voltage. For example, if the error voltage is less than a certain value (e.g. by checking a comparator), then no dynamic load transient condition is present and therefore no aliasing should occur at the base value $Fsw_0$, and the DFC circuitry 110 can change the switching frequency Fsw back to $Fsw_0$. In another embodiment, the controller 102 can monitor Fload. If Fload decreases sufficiently, then no dynamic load transient condition is present and the DFC circuitry 110 can change the switching frequency Fsw back to the base value $Fsw_0$.

The ability to move Fsw away from the base value $Fsw_0$ can be disabled under certain conditions. For example, the DFC circuitry 110 may be prevented from changing Fsw in the following VR states: non-active states e.g. during start up and shutdown; DVID transition states (transitioning from one target voltage to another); during single phase regulation when only one phase 100 is used to regulate the load 104; and/or during dynamic phasing add/drop when one or more phases 100 are being added or dropped from regulation.

By changing Fsw in response to Fload in a multiphase VR system whose Fsw is otherwise fixed, the oscillations that do arise fall outside the bandwidth of the control loop where loop gain is low, reducing or eliminating aliasing effects on the phase currents. The DFC circuitry 110 can also change the switching frequency Fsw from $Fsw_1$ back to the base value $Fsw_0$ after detecting no dynamic load transients over a defined time interval Nfsw2. The defined time intervals Nfsw1 and Nfsw2 are design choices, and can be permanently set or programmable so as to avoid changing Fsw more often than warranted.

In general, the value of $Fsw_1$ depends on the bandwidth of the controller 102, which is also a design parameter. Hence, any $Fsw_1$ which avoids aliasing affects when Fload is at or near the base value $Fsw_0$ or % $Fsw_0$ can be used and within the scope of the embodiments described herein.

Figure 3A:
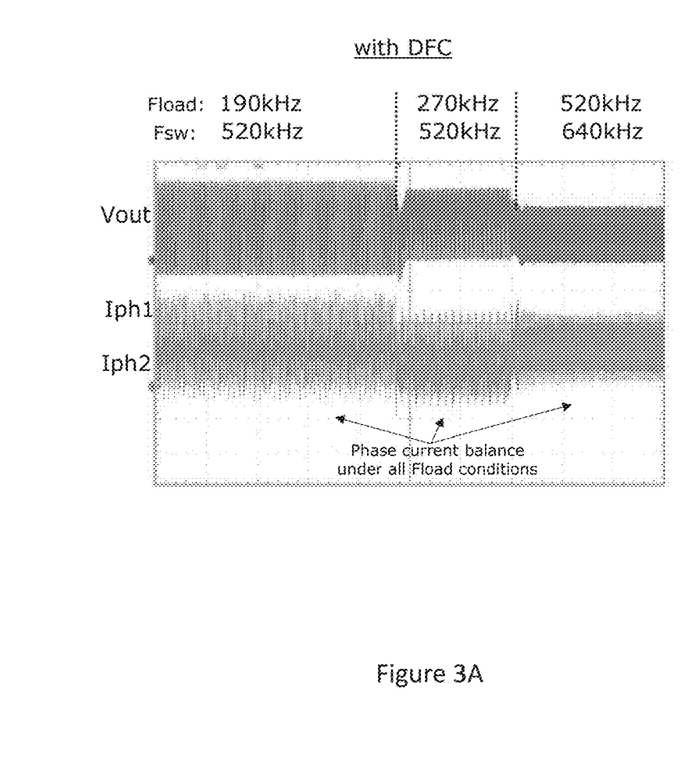

FIG. 3A plots output voltage Vout and phase currents $i_{ph1}$ and $i_{ph2}$ for three different load frequency (Fload) examples:

190 kHz, 270 kHz and 520 kHz. The multiphase voltage regulator system initially operates at a switching frequency Fsw of 520 kHz and the dynamic load transient frequency Fload is initially at 190 kHz in this example. The load and switching frequencies discussed herein are merely for illustrative purposes, and should not be considered limiting in any way. Since any oscillations which occur at the difference between 520 kHz and 190 kHz fall outside the bandwidth of the controller 102, the DFC circuitry 110 does not change Fsw. That is, Fsw remains fixed at 520 kHz.

However, as Fload increases from 190 kHz to near Fsw, oscillations will fall within the bandwidth of the controller 102, and due to higher loop gain, cause aliasing effects and thus imbalance in the phase currents if unmitigated. The middle part of FIG. 3A shows the dynamic load transient frequency Fload at 270 kHz. At this frequency, the oscillations become more prominent since loop gain is higher at the frequency delta of 520 kHz-270 kHz compared to 520 kHz-190 kHz. However, Fsw need not necessarily be moved away from Fload at this point since the loop gain is still sufficiently low at that oscilation frequency. The righthand part of FIG. 3A shows the dynamic load transient frequency Fload at 520 kHz, which equals Fsw in this example. If unmitigated, significant aliasing effects would occur under these conditions, since the oscillations are subject to high loop gain.

To avoid aliasing effects on the phase currents, the DFC circuitry 110 changes the switching frequency Fsw from 520 kHz to a different value sufficiently away from Fload to avoid or at least meaningfully reduce aliasing effects. For example, Fsw is moved to 640 kHz. By moving Fsw away from Fload by a sufficient margin, oscillations again fall outside the bandwidth of the controller 102 where loop gain is relatively low and the multiphase VR system experiences no meaningful or at least tolerable aliasing effects. Contrast this with FIG. 3B, which shows the same Fsw and Fload examples described above, except without intervention by the DFC circuitry 110. As can be seen in the righthand part of FIG. 3B, circulating current resulting from aliasing leads to significant phase current imbalance.

Figure 3B:
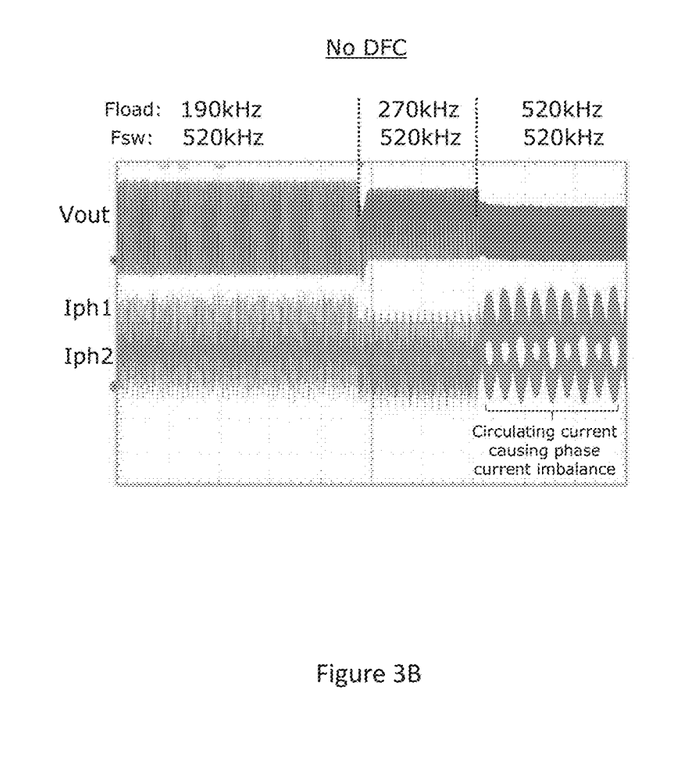
Figure 4A:
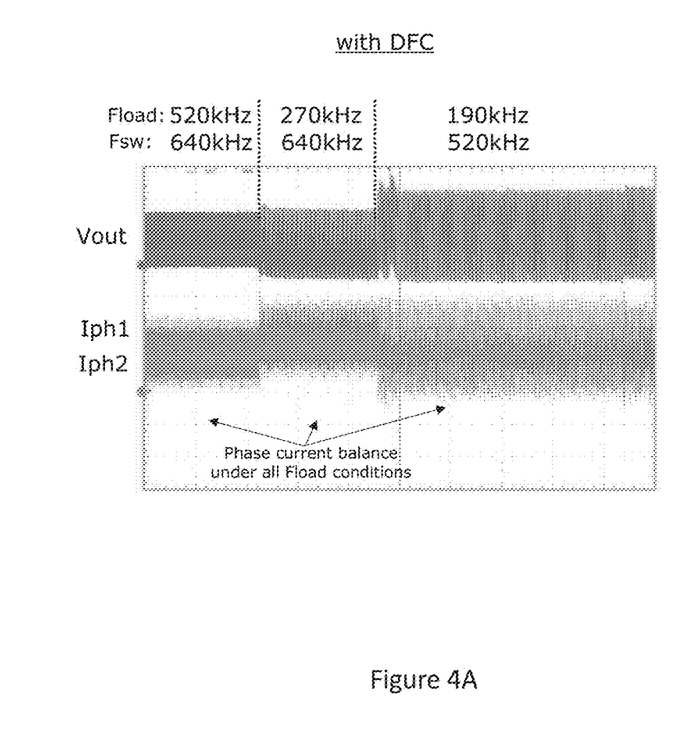

FIG. 4A graphs the output voltage Vout and phase currents $i_{ph1}$ and $i_{ph2}$ for the same dynamic load transient frequency Fload examples in FIGS. 3A and 3B: 190 kHz, 270 kHz and 520 kHz. Different in this example, the multiphase VR system initially operates at a switching frequency Fsw of 520 kHz and the dynamic load transient frequency Fload also is at 520 kHz. To avoid aliasing effects, the DFC circuitry 110 changes the switching frequency Fsw from 520 kHz to a different value sufficiently away from Fload to avoid or at least meaningfully reduce aliasing effects. For example, Fsw is moved to 640 kHz. Again, by moving Fsw away from Fload by a sufficient margin, oscillations fall outside the bandwidth of the controller 102 where loop gain is relatively low and the multiphase VR system experiences no meaningful or at least tolerable aliasing effects. Contrast this with FIG. 4B, which shows the same Fsw and Fload examples as FIG. 4A, except without intervention by the DFC circuitry 110. As can be seen in the left-hand part of FIG. 4B, circulating current resulting from aliasing leads to significant phase current imbalance.

Figure 4B:
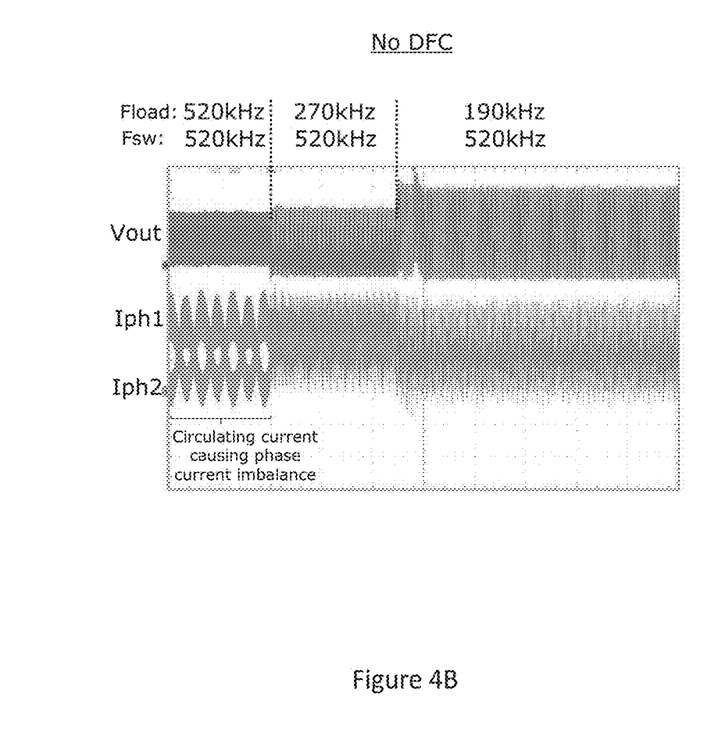

As mentioned above in connection with FIGS. 3A and 3B, the load and switching frequencies Fload and Fsw examples shown in FIGS. 4A and 4B are provided merely for illustrative purposes and should not be considered limiting in any way. However, VR system efficiency tends to drop at frequencies above the base value $Fsw_0$, so Fsw is preferably changed as little as possible while still avoiding or meaningfully reducing aliasing effects and without unduly/overly reducing VR system efficiency.

Figure 5:
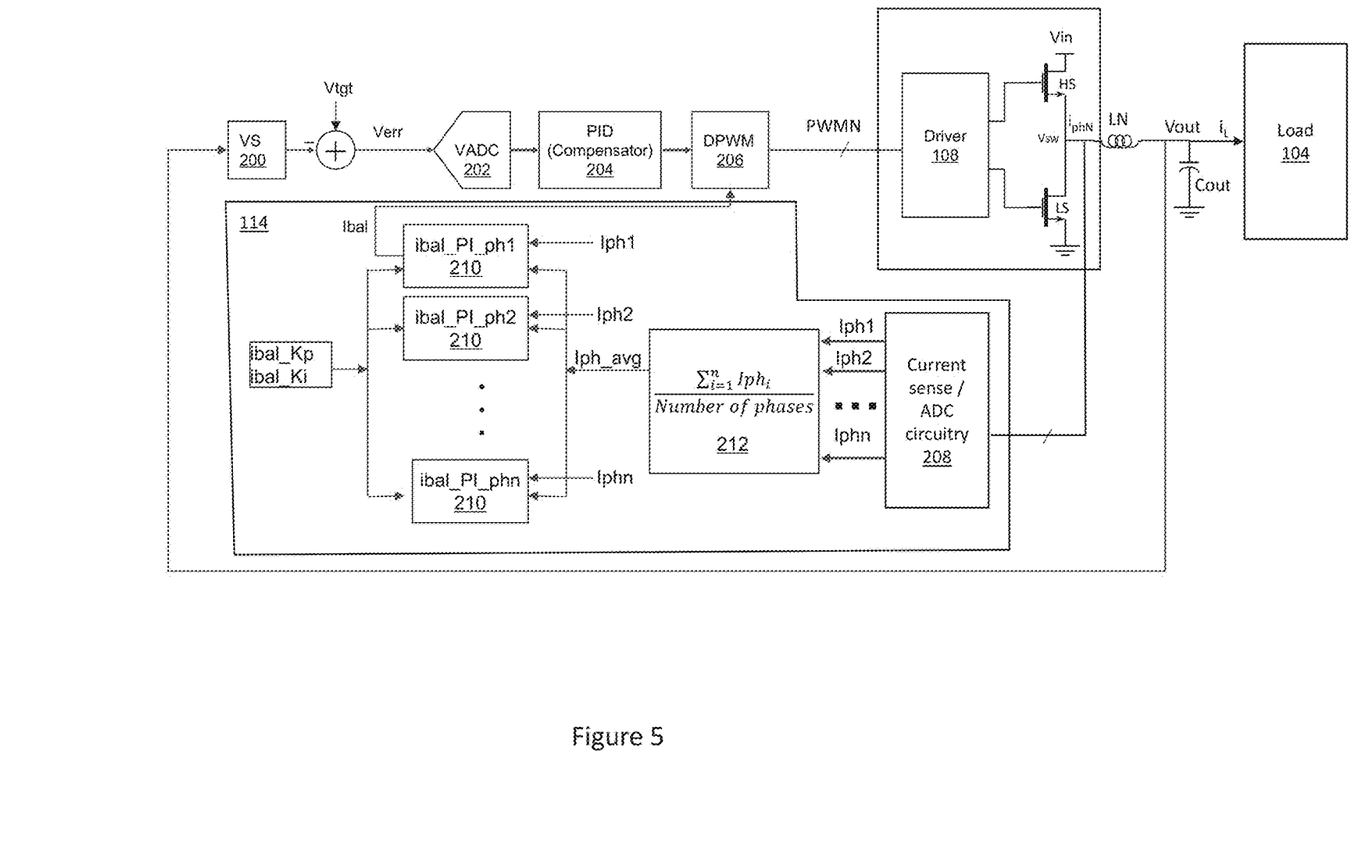
FIG. 5 illustrates a block diagram of an embodiment of a controller for the multiphase voltage regulator of FIG. 1.

FIG. 5 illustrates the multiphase VR controller 102 in more detail, and an embodiment of the current balance circuitry 114 included in or associated with the controller 102. According to this embodiment, the controller 102 includes voltage sense (VS) circuitry 200 for sensing/measuring the regulator output voltage Vout. A voltage sense ADC (analog to digital converter) 202 converts an analog error voltage (Verr) i.e. the difference between sensed/measured Vout and a target voltage (Vtgt), into a digital representation. A PID (proportional-integral-derivative) compensator 204 implements a compensator transfer function with the digital error voltage as an input and duty cycle as the output. The PWM circuitry 112 of the controller 102 includes a multiphase digital PWM 206 that sets the gain for the different phases 102 based on the output of the PID compensator 204 and current balance information (Ibal) from the current balance circuitry 114, and converts the digital duty cycle information into a pulse width modulated waveform (PMWN) that interfaces with the driver 108 to control the on/off states of the switch devices HS, LS of the respective phases 102.

The current balance circuitry 114 includes current sense and ADC circuitry 208 for monitoring the individual phase currents (Iph1, Iph2, . . . , IphN) of the N phases 100, and for converting the monitored phase currents into corresponding digital phase current information which is processed by respective channel current PI (proportional-integral) circuitry 210 for each phase 102 of the VR system. The current balance circuitry 114 also includes an averaging circuit 212 for calculating the average phase current Iph_avg. The current balance circuitry 114 converts the phase current information from the channel current PI circuitry 210 into current balance information (Ibal) which represents corresponding adjustments to the duty cycle of each individual phase 102, to adjust the phase currents so they remain balanced.

The current balance circuitry 114 adjusts the PWM duty cycle of each individual phase 102 to increase or decrease the corresponding phase current relative to the other phases 102.

This is typically done by a filter with the transfer function:

$$dUx=(Iphx-Itargx)*(Ki\_ibal/s+Kp\_ibal) \tag{1}$$

where dUx is the adjustment to the duty cycle in the Xth phase 102, Iphx is the measured current of the Xth phase 102, Itargx is the target current for the Xth phase 102, and Ki_ibal and Kp_ibal are integral and proportional gains, respectively, input to the respective channel current PI circuitry 210. The current balance circuitry 114 adjusts individual phase currents to match a certain allocation as determined by the controller 102 for the total load current, between active ones of the phases 102.

The DFC circuitry 110 included in or associated with the multiphase VR controller 102 is in communication with the current balance circuitry 114, so that the DFC circuitry 110 can change the switching frequency Fsw from $Fsw_0$ to $Fsw_1$ (or vice-versa) if the frequency Fload at which the load current $i_L$ changes repetitively is within a predetermined range of $Fsw_0$ (or $Fsw_1$), as indicated by the absolute different between two phase currents as previously described herein and shown in FIG. 2. This way, oscillations that fall within the bandwidth of the control loop where loop gain is high can be avoided, by making corresponding adjustments to Fsw based on phase current behaviour.

The controller 102 can implement new registers for the phase current-based Fsw adjustment approach. For example, a first register can store the value $Fsw_1$, a second register can store Nfsw1 and Nfsw2, a third register can store a phase current imbalance threshold, a fourth register can store a blanking time imposed after a Fsw frequency hop (change), and fifth register can store an apc (amps per code) delta for $Fsw_1$.

In addition or alternatively, the DFC circuitry 110 included in or associated with the multiphase VR controller 102 can adjust Fsw to avoid oscillations that fall within the bandwidth of the control loop based on Fload measurements. In one embodiment, the controller 102 measures the frequency Fload at which the load current changes and the DFC circuitry 110 changes the switching frequency Fsw from $Fsw_0$ to $Fsw_1$ (or vice-versa) if the difference between the measured frequency of the load current and $Fsw_0$ (of $Fsw_1$) is within the bandwidth of the controller 102. For example, the controller 102 can measure the rate of change of the output voltage Vout of the multiphase VR system (e.g. via a counter) and convert the measured rate of change to a frequency indicative of the frequency Fload at which the load current changes. In another embodiment, the controller 102 includes active transient response (ATR) circuitry for detecting and responding to transient conditions at the load 104. If frequency (FATR) of a detected transient load condition is within the range of ½ Fsw±x or Fsw±y, the DFC circuitry 110 can change $Fsw_0$ to $Fsw_1$ (or vice-versa). If FATR does not fall within one of those regions, the DFC circuitry 110 can change Fsw back to the base value $Fsw_0$. The parameters x, y, $Fsw_0$ and $Fsw_1$ can be programmable parameters set by the user.

In addition or alternatively, the DFC circuitry 110 included in or associated with the multiphase VR controller 102 can adjust Fsw to avoid oscillations that fall within the bandwidth of the control loop based on direct measurements of the phase current imbalance frequency. In one embodiment, the controller 102 determines the phase current imbalance frequency based on phase current measurements taken for the plurality of phases 100 and the DFC circuitry 110 changes the switching frequency Fsw from $Fsw_0$ to $Fsw_1$ (or vice-versa) if the measured phase current imbalance frequency is lower than a threshold frequency.

Figure 6:
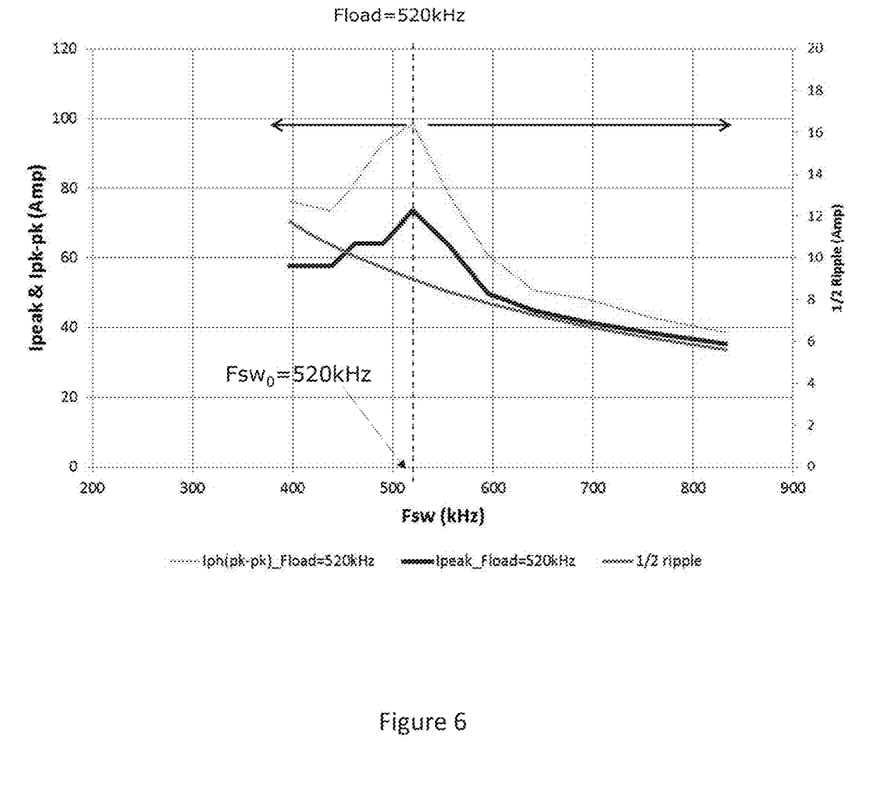
FIG. 6 illustrates a graphical diagram plotting the effect of changing the regulator switching frequency based on the dynamic load transient frequency.

FIG. 6 illustrates the effect of changing the switching frequency Fsw based on the dynamic load transient frequency Fload. In this example, the Fload is 520 kHz. The peak current (Ipeak), the peak-to-peak phase current difference (Iph(pk–pk)) and half ripple current (½ ripple) are plotted as a function of Fsw and Fload. The peak current Ipeak and the peak-to-peak phase current difference Iph(pk–pk) spike when Fsw=Fload. By moving Fsw away from Fload as described herein, both Ipeak and Iph(pk–pk) drop significantly. In the example shown, the peak-to-peak phase current difference Iph(pk–pk) decreases by about 30 A when Fload is 520 kHz and Fsw is moved from $Fsw_0$=520 kHz to $Fsw_1$=400 kHz, and decreases by about 60 A by instead moving Fsw from $Fsw_0$=520 kHz to $Fsw_1$=800 kHz. However, Fsw values above the base value $Fsw_0$ decrease the VR system efficiency, so efficiency is a trade-off with peak current and peak-to-peak phase current performance. Ripple current also improves (decreases) with higher Fsw.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A multiphase voltage regulator, comprising:
a plurality of phases, each phase configured to output a phase current to a load through an inductor in response to a control signal input to the phase; and
a controller operable to:
generate the control signals input to the phases;
set a switching frequency of the control signals to a first value; and
change the switching frequency from the first value to a second value different than the first value if the load current changes repetitively at a frequency that is within a predetermined range of the first value of the switching frequency.

2. The multiphase voltage regulator of claim 1, wherein the controller is operable to adjust a duty cycle of one or more of the control signals to balance the phase currents, and change the switching frequency from the first value to the second value if the phase currents cannot be balanced without exceeding a peak current limit of the inductors.

3. The multiphase voltage regulator of claim 1, wherein the controller is operable to change the switching frequency from the first value to the second value if the difference between two of the phase currents exceeds a threshold value for longer than a defined time interval.

4. The multiphase voltage regulator of claim 3, wherein the threshold value and the defined time interval are selected so that the controller is operable to change the switching frequency from the first value to the second value before a peak current limit of the inductors is exceeded.

5. The multiphase voltage regulator of claim 1, wherein the controller is operable to determine the second value from a lookup table or based on a formula programmed into the controller.

6. The multiphase voltage regulator of claim 1, wherein the controller is operable to measure the frequency at which the load current changes, and change the switching frequency from the first value to the second value if the difference between the measured frequency of the load current and the first value is within a bandwidth of the controller.

7. The multiphase voltage regulator of claim 6, wherein the controller is operable to measure the rate of change of an output voltage of the multiphase voltage regulator and convert the measured rate of change to a frequency indicative of the frequency at which the load current changes.

8. The multiphase voltage regulator of claim 1, wherein the controller is operable to determine a phase current imbalance frequency based on phase current measurements taken for the plurality of phases, and change the switching frequency from the first value to the second value if the measured phase current imbalance frequency is lower than a threshold frequency.

9. The multiphase voltage regulator of claim 1, wherein the controller is operable to change the switching frequency from the second value back to the first value if the frequency at which the load current changes repetitively moves to within a predetermined range of the second value of the switching frequency.

10. The multiphase voltage regulator of claim 1, wherein the controller is operable to change the switching frequency from the second value back to the first value after detecting no dynamic load transients over a defined time interval.

11. A method of operating a multiphase voltage regulator that has a plurality of phases, each phase configured to output a phase current to a load through an inductor in response to a control signal input to the phase, the method comprising:
 setting a switching frequency of the control signals to a first value; and
 changing the switching frequency from the first value to a second value different than the first value if the load current changes repetitively at a frequency that is within a predetermined range of the first value of the switching frequency.

12. The method of claim 11, wherein changing the switching frequency from the first value to the second value comprises:
 adjusting a duty cycle of one or more of the control signals to balance the phase currents; and
 changing the switching frequency from the first value to the second value if the phase currents cannot be balanced without exceeding a peak current limit of the inductors.

13. The method of claim 11, wherein changing the switching frequency from the first value to the second value comprises:
 measuring the phase currents; and
 changing the switching frequency from the first value to the second value if the difference between two of the phase currents exceeds a threshold value for longer than a defined time interval.

14. The method of claim 13, further comprising:
 selecting the threshold value and the defined time interval so that the switching frequency changes from the first value to the second value before a peak current limit of the inductors is exceeded.

15. The method of claim 11, further comprising:
 determining the second value from a lookup table or based on a formula programmed into a controller of the multiphase voltage regulator.

16. The method of claim 11, wherein changing the switching frequency from the first value to the second value comprises:
 measuring the frequency at which the load current changes; and
 changing the switching frequency from the first value to the second value if the difference between the measured frequency of the load current and the first value is within a bandwidth of a controller of the multiphase voltage regulator.

17. The method of claim 16, wherein measuring the frequency at which the load current changes comprises:
 measuring the rate of change of an output voltage of the multiphase voltage regulator; and
 converting the measured rate of change to frequency.

18. The method of claim 11, wherein changing the switching frequency from the first value to the second value comprises:
 determining a phase current imbalance frequency based on phase current measurements taken for the plurality of phases; and
 changing the switching frequency from the first value to the second value if the measured phase current imbalance frequency is lower than a threshold frequency.

19. The method of claim 11, further comprising:
 changing the switching frequency from the second value back to the first value if the frequency at which the load current changes repetitively moves to within a predetermined range of the second value of the switching frequency.

20. The method of claim 11, further comprising:
 changing the switching frequency from the second value back to the first value after detecting no dynamic load transients over a defined time interval.

* * * * *